(12) United States Patent
Okuyama

(10) Patent No.: US 10,239,483 B2
(45) Date of Patent: Mar. 26, 2019

(54) GAS GENERATOR AND ASSEMBLING METHOD THEREOF

(71) Applicant: Daicel Corporation, Osaka-shi, Osaka (JP)

(72) Inventor: Takashi Okuyama, Tatsuno (JP)

(73) Assignee: Daicel Corporation, Osaka-shi, Osaka (JP)

( * ) Notice: Subject to any disclaimer, the term of this patent is extended or adjusted under 35 U.S.C. 154(b) by 0 days.

(21) Appl. No.: 15/643,327

(22) Filed: Jul. 6, 2017

(65) Prior Publication Data

US 2017/0305384 A1    Oct. 26, 2017

Related U.S. Application Data

(62) Division of application No. 15/062,684, filed on Mar. 7, 2016, now Pat. No. 9,731,679, which is a division
(Continued)

(30) Foreign Application Priority Data

Oct. 4, 2012    (JP) ................................ 2012-221813

(51) Int. Cl.
*B60R 21/264*    (2006.01)
*F42B 3/04*    (2006.01)
(Continued)

(52) U.S. Cl.
CPC ........ *B60R 21/2644* (2013.01); *B60R 21/264* (2013.01); *C06D 5/00* (2013.01);
(Continued)

(58) Field of Classification Search
CPC ........ B60R 21/264; B60R 2021/26076; B60R 2021/26082; B60R 21/2644; C06D 5/00; F42B 3/04
(Continued)

(56) References Cited

U.S. PATENT DOCUMENTS 4,734,265 A    3/1988    Nilsson et al.
6,009,809 A    1/2000    Whang
(Continued)

FOREIGN PATENT DOCUMENTS

CN    1817697 A    8/2006
CN    101529196 A    9/2009
(Continued)

*Primary Examiner* — Bret Hayes
(74) *Attorney, Agent, or Firm* — Birch, Stewart, Kolasch & Birch, LLP

(57) ABSTRACT

A gas generator includes, a housing with a gas discharge port, an igniter assembly and a gas generating agent in the housing; and a metallic cup of constant inner diameter covering the igniter to define a charging chamber. The igniter assembly includes a main body, including an ignition portion and an electro-conductive pin integrated with a metallic collar by a resin. The metallic collar has a fixing portion inserted into a hole in a bottom surface of the housing and a remaining portion projecting inward from the bottom surface of the housing, and a guide portion. An inner circumferential wall surface of the metallic cup and an outer circumferential wall surface of the fixing portion are press-fitted, and an annular gap is formed between the inner circumferential wall of the metallic cup member and an outer circumferential wall surface of the guide portion.

3 Claims, 5 Drawing Sheets

Related U.S. Application Data of application No. 14/045,623, filed on Oct. 3, 2013, now abandoned.

(60) Provisional application No. 61/709,920, filed on Oct. 4, 2012.

(51) Int. Cl.
*C06D 5/00* (2006.01)
*B60R 21/26* (2011.01)

(52) U.S. Cl.
CPC ...... *F42B 3/04* (2013.01); *B60R 2021/26029* (2013.01); *B60R 2021/2648* (2013.01); *B60R 2021/26076* (2013.01); *Y10T 29/49826* (2015.01)

(58) Field of Classification Search
USPC ........... 102/202.5–202.12, 202.14, 530, 531; 280/741
See application file for complete search history.

(56) References Cited

U.S. PATENT DOCUMENTS

| | | | |
|---|---|---|---|
| 6,135,496 A | 10/2000 | Katsuda et al. | |
| 6,139,055 A | 10/2000 | Dahl et al. | |
| 7,762,585 B2* | 7/2010 | Patterson | B60R 21/26 |
| | | | 280/736 |
| 8,167,334 B2* | 5/2012 | Kratz | B60R 21/2644 |
| | | | 102/531 |
| 8,240,709 B1 | 8/2012 | Quioc | |
| 8,997,655 B1 | 4/2015 | Ranson et al. | |
| 2001/0042298 A1 | 11/2001 | Katsuda et al. | |
| 2002/0050703 A1* | 5/2002 | Whang | B60R 21/2644 |
| | | | 280/737 |
| 2002/0053788 A1* | 5/2002 | Iwai | B60R 21/2644 |
| | | | 280/736 |
| 2003/0184068 A1* | 10/2003 | Nakashima | B60R 21/2644 |
| | | | 280/741 |
| 2004/0046373 A1 | 3/2004 | Wang et al. | |
| 2004/0226472 A1 | 11/2004 | Oda | |
| 2004/0250542 A1 | 12/2004 | Nishina | |
| 2005/0035579 A1 | 2/2005 | Cantererry et al. | |
| 2005/0151357 A1 | 7/2005 | Yamazaki | |
| 2006/0131853 A1* | 6/2006 | Iwai | B60R 21/2644 |
| | | | 280/736 |
| 2006/0214403 A1 | 9/2006 | Matsuda et al. | |
| 2007/0057496 A1 | 3/2007 | Matsuda et al. | |
| 2007/0193464 A1 | 8/2007 | Hironaka et al. | |
| 2007/0257477 A1 | 11/2007 | Ohji et al. | |
| 2008/0060541 A1 | 3/2008 | Fujii et al. | |
| 2008/0067791 A1 | 3/2008 | Yamazaki | |
| 2008/0136152 A1 | 6/2008 | McFarland | |
| 2008/0217895 A1* | 9/2008 | Hayakawa | B60R 21/2644 |
| | | | 280/741 |
| 2008/0257195 A1 | 10/2008 | Nakayasu et al. | |
| 2010/0071580 A1 | 3/2010 | Nakayasu et al. | |
| 2012/0024186 A1 | 2/2012 | Mitsunabe et al. | |
| 2013/0199398 A1* | 8/2013 | Mitsunabe | C06D 5/00 |
| | | | 102/530 |

FOREIGN PATENT DOCUMENTS

| | | |
|---|---|---|
| JP | 2003-161599 A | 6/2003 |
| JP | 2005-178599 A | 7/2005 |
| JP | 2007-15675 A | 1/2007 |
| JP | 2007-139366 A | 6/2007 |
| JP | 2007-296891 A | 11/2007 |
| JP | 2010-70073 A | 4/2010 |
| JP | 2012-30639 A | 2/2012 |
| JP | 2012-158238 A | 8/2012 |

* cited by examiner (a)   (b)

(a)  (b)

GAS GENERATOR AND ASSEMBLING METHOD THEREOF

CROSS REFERENCE PARAGRAPH

This application is a Divisional of copending application Ser. No. 15/062,684, filed on Mar. 7, 2016, which is a Divisional of application Ser. No. 14/045,623, filed on Oct. 3, 2013, which claims priority under 35 U. S. C. § 119(a) to Patent Application No. 2012-221813 filed in Japan on Oct. 4, 2012 and 35 U. S. C. § 119(e) to U. S. Provisional application No. 61/709,920 filed on Oct. 4, 2012; the entire contents of each of which are hereby incorporated by reference.

BACKGROUND OF INVENTION

Field of Invention

The present invention relates to a gas generator used for a restraining apparatus for a vehicle, such as an airbag apparatus, and to an assembling method thereof.

Description of the Related Art

In a gas generator for deploying an airbag, a variety of parts are accommodated in a housing, and those parts are fixed to each other with a fixing means such as welding.

However, with some methods, the parts are fixed to each other by press-fitting, without using welding, in order to reduce cost and facilitate the assembling process.

In a gas generator 10 disclosed in U.S. Pat. No. 6,139,055, openings 36, 38 are formed in the bottom portion of a base 16 forming a housing 12, and an adaptor plug 70 holding an initiator 62 is fixed therein. A cup-shaped housing 52 is attached to the adaptor plug 70, and the opening of the housing 52 is closed by the adaptor plug 70.

In the gas generator disclosed in FIG. 3 of JP-A No. 2003-161599, a tubular member is fitted to a metallic collar of an igniter. The inner diameter of the portion of the tubular member, that abuts against the metallic collar, is enlarged and formed with a step for fitting the metallic collar to the inner circumferential surface.

SUMMARY OF THE INVENTION

The invention 1 provides a gas generator, the gas generator including:
a housing provided with a gas discharge port;
an igniter assembly and a gas generating agent accommodated in the housing;
a metallic cup member having a constant inner diameter and covering the igniter assembly to define a charging chamber for charging the gas generating agent;
in the igniter assembly,
an igniter main body, which includes an ignition portion and a electro-conductive pin, being integrated with a metallic collar by a resin;
the metallic collar having,
a fixing portion including a portion inserted into a hole in a bottom surface of the housing and a remaining portion projecting to an inner side of the bottom surface of the housing, and
a guide portion formed axially in connection with the fixing portion between the fixing portion and the resin axially in connection with the fixing portion,
the guide portion having an inclined surface in which an outer diameter (D3) of a first portion in contact with the fixing portion is a maximum diameter and an outer diameter (D4) of a second portion on the axially opposite side to the first portion is a minimum diameter;
the metallic cup member and the metallic collar satisfying
D1=D3, where (D1) is an outer diameter of the fixing portion,
D1=D3≥R1, where (R1) is an inner diameter of the metallic cup member, and
R1>D4; and
the metallic cup member being fixed in a state in which an inner circumferential wall surface of the metallic cup member and an outer circumferential wall surface of the fixing portion are press-fitted, and an annular gap is formed between the inner circumferential wall surface of the metallic cup member and an outer circumferential wall surface of the guide portion.

The invention 2 provides a gas generator, the gas generator including:
a housing provided with a gas discharge port;
an igniter assembly and a gas generating agent accommodated in the housing;
a metallic cup member having a constant inner diameter and covering the igniter assembly to define a charging chamber for charging the gas generating agent;
in the igniter assembly,
an igniter main body, which includes an ignition portion and a electro-conductive pin, being integrated with a metallic collar by a resin;
the metallic collar having,
a fixing portion including a portion inserted into a hole in a bottom surface of the housing and a remaining portion projecting to an inner side of the bottom surface of the housing, and
a guide portion formed axially in contact with the fixing portion;
the metallic cup member and the metallic collar satisfying
D1>D2, where (D1) is an outer diameter of the fixing portion and (D2) is an outer diameter of the guide portion,
D1≥R1, where (R1) is an inner diameter of the metallic cup member, and
R1>D2; and
the metallic cup member being fixed in a state in which an inner circumferential wall surface of the metallic cup member and an outer circumferential wall surface of the fixing portion are press-fitted, and an annular gap is formed between the inner circumferential wall surface of the metallic cup member and an outer circumferential wall surface of the guide portion.

The invention 3 provides a gas generator, the gas generator including:
a housing provided with a gas discharge port;
an igniter assembly and a gas generating agent accommodated in the housing;
a metallic cup member having a constant inner diameter and covering the igniter assembly to define a charging chamber for charging the gas generating agent;
in the igniter assembly,
an igniter main body, which includes an ignition portion and a electro-conductive pin, being integrated with a metallic collar by a resin;
the metallic collar having,
a fixing portion including a portion inserted into a hole in a bottom surface of the housing and a first remaining portion projecting and exposed to an inner side of the bottom surface of the housing, and a guide portion formed by the resin enclosing a second remaining portion except for the first remaining portion of the metallic collar;

the metallic cup member and the metallic collar satisfying $D1=D5$, where (D1) is an outer diameter of the fixing portion and (D5) is an outer diameter of the guide portion, and $D1=D5 \geq R1$, where (R1) is an inner diameter of the metallic cup; and the metallic cup member being fixed in a state in which an inner circumferential wall surface of the metallic cup member and an outer circumferential wall surface of the fixing portion are press-fitted, and the inner circumferential wall surface of the metallic cup member and an outer circumferential wall surface of the guide portion are abutted against each other. The invention 4 provides a gas generator, the gas generator including:

a housing provided with a gas discharge port;

an igniter assembly and a gas generating agent accommodated in the housing;

a metallic cup member having a constant inner diameter and covering the igniter assembly to define a charging chamber for charging the gas generating agent;

in the igniter assembly, an igniter main body, which includes an ignition portion and a electro-conductive pin, being integrated with a metallic collar by a resin;

the metallic collar having, a fixing portion including a portion inserted into a hole in a bottom surface of the housing and a first remaining portion projecting and exposed to an inner side of the bottom surface of the housing, and a guide portion formed by the resin enclosing a second remaining portion except for the first remaining portion of the metallic collar;

the guide portion including a cylindrical portion and a plurality of protruding portions protruding radially from an outer circumferential surface of the cylindrical portion;

the metallic cup member and the metallic collar satisfying $D1=D8$, where (D1) is an outer diameter of the fixing portion and (D8) is an outer diameter of an imaginary circle defined by connecting tips of the protruding portions of the guide portion, $D1=D8 \geq R1$, where (R1) is an inner diameter of the metallic cup member; and the metallic cup member being fixed in a state in which an inner circumferential wall surface of the metallic cup member and an outer circumferential wall surface of the fixing portion are press-fitted, and the inner circumferential wall surface of the metallic cup member and an outer circumferential wall surface of the protruding portions of the guide portion are abutted against each other.

The invention 5 provides a gas generator, the gas generator including:

a housing provided with a gas discharge port;

an igniter assembly and a gas generating agent accommodated in the housing;

a metallic cup member having a constant inner diameter and covering the igniter assembly to define a charging chamber for charging the gas generating agent;

in the igniter assembly, an igniter main body, which includes an ignition portion and a electro-conductive pin, being integrated with a metallic collar by a resin;

the metallic collar having, a fixing portion including a portion inserted into a hole in a bottom surface of the housing and a first remaining portion projecting and exposed to an inner side of the bottom surface of the housing, and a guide portion formed by the resin enclosing a second remaining portion except for the first remaining portion of the metallic collar;

the guide portion including a second guide portion formed axially in contact with the fixing portion, and a first guide portion formed axially in contact with the second guide portion;

the metallic cup member and the metallic collar satisfying $D1=D6$, where (D1) is an outer diameter of the fixing portion and (D6) is an outer diameter of the first guide portion, $D1>D7$, where (D7) is an outer diameter of the second guide portion, $D1=D6 \geq R1$, where (R1) is an inner diameter of the metallic cup, and $R1>D7$; and the metallic cup member being fixed in a state in which an inner circumferential wall surface of the metallic cup member and an outer circumferential wall surface of the fixing portion are press-fitted, an annular gap is formed between the inner circumferential wall surface of the metallic cup member and an outer circumferential wall surface of the second guide portion, and the inner circumferential wall surface of the metallic cup member and an outer circumferential wall surface of the first guide portion are abutted against each other.

Further, the present invention provides a method for assembling the gas generator of the invention 1, invention 2, invention 3, invention 4 or invention 5.

And, the present invention provides a method for assembling the gas generator of invention 1, invention 2, invention 3, invention 4 or invention 5, including a step of fitting and fixing the metallic cup member to the igniter assembly that is fixed to the bottom surface of the housing, wherein, the fitting and fixing step further includes, aligning a central axis of the metallic cup member and a central axis of the igniter assembly when the metallic cup member is fitted to the igniter assembly from a side of the ignition portion thereof, inserting (fitting) and fixing an opening of the metallic cup member to the fixing portion through the guide portion, and correcting a displacement of the central axis of the metallic cup member and a central axis of the igniter assembly while inserting (fitting) the opening of the metallic cup member through the guide portion, when the central axis of the metallic cup member and the central axis of the igniter assembly are displaced with respect to each other.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
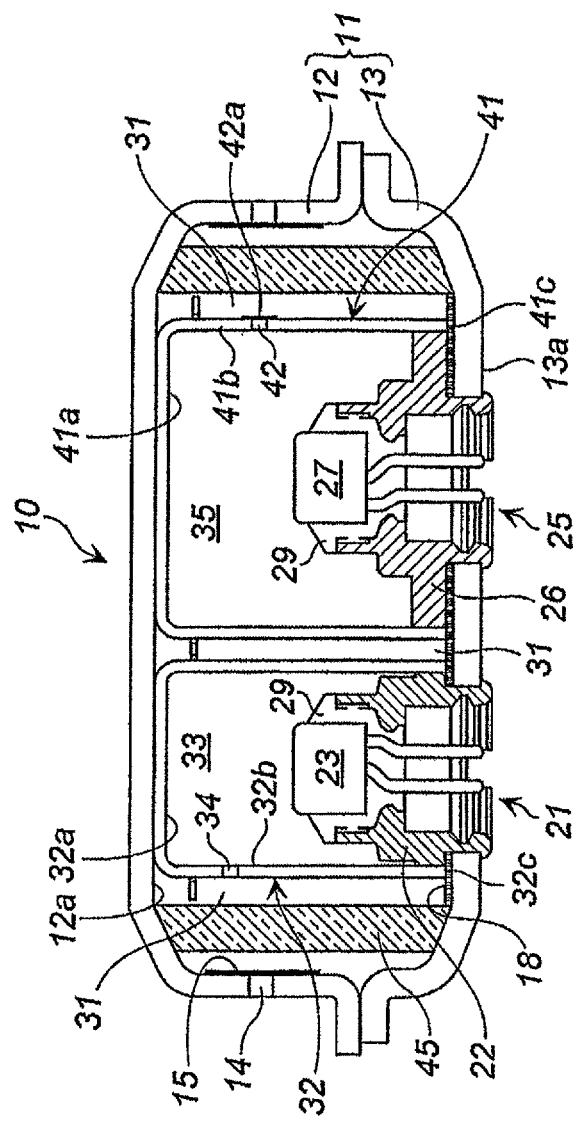
FIG. 1 is an axial sectional view of the gas generator in accordance with the present invention.

When the gas generator 10 disclosed in U.S. Pat. No. 6,139,055 is assembled, the housing 52 is fitted to be press-fitted to the adaptor plug 70, but since the thickness of the adaptor plug 70 (thickness in the fitting direction of the housing 52) is large, a large load is necessary for press-fitting.

Therefore, when the housing 52 is mounted obliquely with respect to the adaptor plug 70 during the press-fitting operation, even larger load is required to continue the press-fitting in a forced manner, and the housing 52 can be deformed.

In such a case, it is desirable that the tilt of the housing be corrected in the course of the press-fitting operation, but once the housing 52 has been mounted obliquely with respect to the adaptor plug 70, the opening of the housing 52 often bites into the adaptor plug 70 and the tilt is difficult to correct.

In the gas generator disclosed in JP-A No. 2003-161599, the tubular member is not press-fitted into the metallic collar.

The present invention provides a gas generator which includes a cup member that is fitted and fixed to an igniter assembly and that is easily assembled and has a reduced occurrence of deformation or damage of the member including the cup member in the assembling process, and also to provide an assembling method for the gas generator.

The gas generator of the invention 2 is in the mutual arrangement (the fixing state) of the igniter assembly and the metallic cup member, and other constituent elements can be the same as in a known gas generator.

The metallic cup member in the gas generator of the invention 2 can be not only of a cup-like shape, but also of a tubular shape and a tubular shape in which the opening at one end side is closed with a lid.

The chamber for charging a gas generating agent formed by the metallic cup member is a flame-transferring chamber or an ignition chamber filled with a transfer charge or a gas generating agent as an ignition agent, or a combustion chamber charged with a gas generating agent serving as a gas source.

With the gas generator of the invention 2, since the abovementioned dimensional relationship is satisfied, even when the central axis of the igniter assembly and the central axis of the metallic cup member are displaced with respect to each other in the fitting process performed after the axes have been aligned, the position of the central axis of the metallic cup member can be easily corrected by the guide portion and, therefore, the risk of the parts deforming and breaking in the fitting operation is greatly reduced.

When the metallic cup member is thereafter press-fitted to the fixing portion, the metallic cup member is aligned along the axis by the guide portion and the effect of inhibiting the deformation of the metallic cup member is increased.

Further, since the relationship $D1 \geq R1$ between the inner diameter (R1) of the metallic cup member and the outer diameter (D1) of the fixing portion is satisfied, the metallic cup member is fixed in a state in which the inner circumferential wall surface thereof is press-fitted to the outer circumferential wall surface of the fixing portion.

The metallic cup member and the metallic collar may be made from the same metal, but are preferably made from different metals. It is especially preferred that they be made from metals that differ in hardness (for example, in Vickers hardness). In this case, for example, the metallic cup member can be made to have a higher hardness and the metallic collar can be made to have a lower hardness, or the hardness relationship may be reversed.

For example, the metallic cup member can be made from stainless steel, and the metallic collar can be made from aluminum or carbon steel.

The metallic cup member and metallic collar made from metals that are different in hardness are preferably used because the deformations occurring when the metallic cup member is press-fitted can be inhibited and the press-fitting can be performed such as to shave off the circumferential surface of the fixing portion, thereby ensuring a better press-fitted state.

The gas generator of the invention 1 and the gas generator of the invention 2 are identical except that the shapes of the guide portion are different.

The guide portion has a inclined surface (a trapezoidal cross-sectional shape) in which the outer diameter (D3) of a portion that is in contact with the fixing portion is a maximum diameter, and the outer diameter (D4) of a portion on the axially opposite side is a minimum diameter.

Since the abovementioned dimensional relationship is satisfied, even when the central axis of the igniter assembly and the central axis of the metallic cup member are displaced with respect to each other in the fitting process performed after the axes have been aligned, the position of the central axis of the metallic cup member is easily corrected by the guide portion and, therefore, the risk of the parts deforming and breaking in the fitting operation is greatly reduced, in the same manner as in the invention 2.

The gas generator of the invention 3 and the gas generator of the invention 2 are identical except that the shapes and the materials of the guide portions are different. The guide portion of the invention 3 is made from a resin.

Since the abovementioned dimensional relationship is satisfied and the guide portion is made from a resin, even when the central axis of the igniter assembly and the central axis of the metallic cup member are displaced with respect to each other in the fitting process performed after the axes have been aligned, the position of the central axis of the metallic cup member is easily corrected by the guide portion and, therefore, the risk of the parts deforming and breaking in the fitting operation is greatly reduced, in the same manner as in the invention 2.

Further, even though $D5 > R1$, since there is a large difference in hardness between the metallic cup member and the resin, when the metallic cup member is fitted to the guide portion, the fitting can be performed by shaving off the resin on the outer circumferential surface of the guide portion. Therefore, the fitting operation is smoothly realized.

The gas generator of the invention 5 and the gas generator of the invention 2 are identical except that the shapes and the materials of the guide portions are different. The guide portion of the invention 5 is made from a resin.

Since the abovementioned dimensional relationship is satisfied and the guide portion is made from a resin, even when the central axis of the igniter assembly and the central axis of the metallic cup member are displaced with respect to each other in the fitting process performed after the axes have been aligned, the position of the central axis of the metallic cup member is easily corrected by the second guide portion and, therefore, the risk of the parts deforming and breaking in the fitting operation is greatly reduced, in the same manner as in the invention 2.

Further, even though D6>R1, since there is a large difference in hardness between the metallic cup member and the resin, when the metallic cup member is fitted to the first guide portion, the fitting can be performed by shaving off the resin on the outer circumferential surface of the first guide portion. Therefore, the fitting operation is smoothly realized.

The gas generator of the invention 4 and the gas generator of the invention 2 are identical except that the shapes and the materials of the guide portions are different. The guide portion of the invention 4 is made from a resin.

Since the abovementioned dimensional relationship is satisfied and the guide portion is made from a resin, even when the central axis of the igniter assembly and the central axis of the metallic cup member are displaced with respect to each other in the fitting process performed after the axes have been aligned, the position of the central axis of the metallic cup member is easily corrected by the second guide portion and, therefore, the risk of the parts deforming and breaking in the fitting operation is greatly reduced, in the same manner as in the invention 2.

Further, even though D8>R1, since there is a large difference in hardness between the metallic cup member and the resin, when the metallic cup member is fitted to the guide portion, the fitting is performed by shaving off the resin on the outer circumferential surface of the guide portion. Therefore, the fitting operation is smoothly realized.

With the gas generator in accordance with the present invention, the occurrence of damage of the cup member or the igniter assembly in the assembling process is greatly reduced.

In Invention 1 and Invention 2, the metallic collar includes a fixing portion and a guide portion, and a portion of the fixing portion is fitted into the hole in the bottom surface of the housing and the remaining portion is exposed from the bottom surface of the housing. In Invention 3, Invention 4 and Invention 5, the metallic collar includes a fixing portion and a guide portion. When a portion enclosed by a resin is included in the metallic collar, the portion enclosed by a resin corresponds to the guide portion. A portion of the fixing portion is fitted into the hole in the bottom surface of the housing, and the remaining portion of the fixing portion is a first remaining portion which is exposed from the bottom surface of the housing. The guide portion is the portion enclosed by a resin and this portion is a second remaining portion, excluding the first remaining portion.

The fixing portion includes a portion fitted into the hole of the bottom surface of the housing and the remaining portion.

A portion of the metallic collar is fitted to the hole of the bottom surface of the housing, and the remaining portion is a fixing portion exposed to the inside of the bottom surface of the housing.

Figure 2:
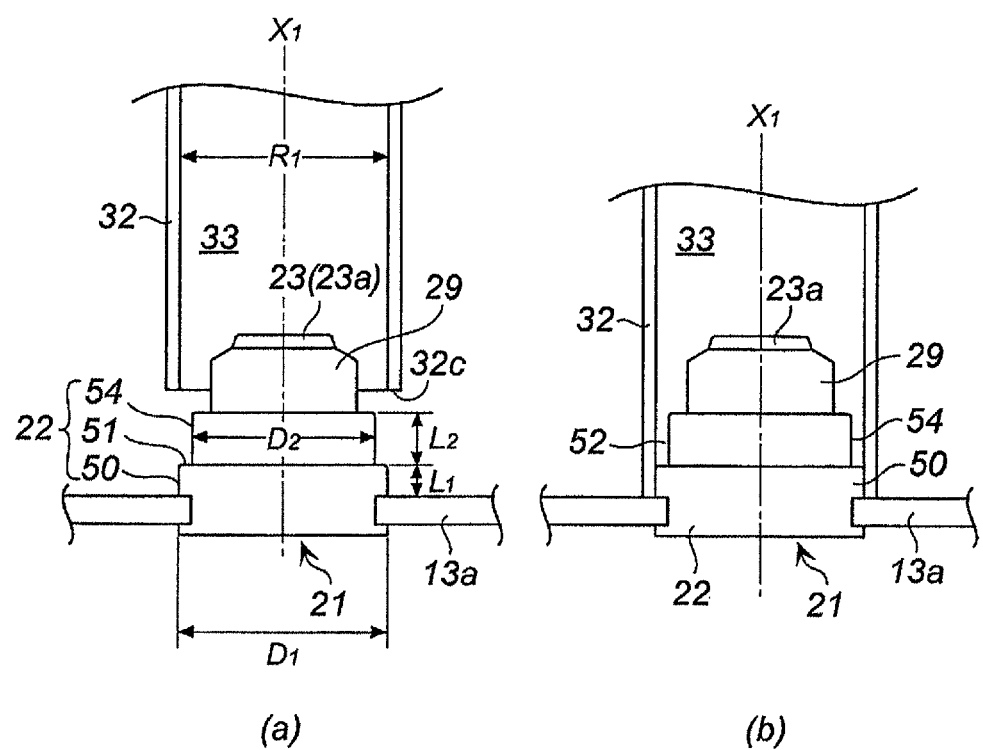
FIG. 2 is an explanatory drawing (an axial sectional view) illustrating a method for assembling the igniter assembly and cup member of the gas generator shown in FIG. 1.

Embodiments of the Invention (1) Gas Generator Shown in FIG. 1 and FIG. 2

A gas generator 10 shown in FIG. 1 is the same as the gas generator shown in FIG. 1 of JP-A No. 2007-15675, except for the fixing state of the igniter assembly 21 and an ignition chamber cup member (a metallic cup member) 32.

In the gas generator 10 for an airbag, an outer container is formed by a housing 11 obtained by joining and integrating a diffuser shell 12 and a closure shell 13.

A plurality of gas discharge ports 14 is formed in the circumferential wall of the diffuser shell 12. The gas discharge ports 14 are closed from inside with an aluminum seal tape 15, and the interior of the housing 11 is maintained in an airtight state.

In the closure shell 13, two holes are provided in a bottom surface 13a serving as a wall surface, and a first ignition device (a first igniter assembly) 21 and a second ignition device (a second igniter assembly) 25 are attached to respective holes.

The first igniter assembly 21 has a first igniter 23 fixed to a first igniter collar 22, and the first igniter collar 22 and the first igniter 23 are integrated by a resin 29.

The second igniter assembly 25 has a second igniter 27 fixed to a second igniter collar 26, and the second igniter collar 26 and the second igniter 27 are integrated by a resin 29.

The first igniter collar 22 and the second igniter collar 26 are made from carbon steel.

The space formed by the housing 11 is a first combustion chamber 31, and a first gas generating agent (not shown in the drawing) is loaded in the inside an annular filter 45.

An ignition chamber cup member 32 is disposed in the first combustion chamber 31. The ignition chamber cup member 32 is a cup that has a uniform inner diameter and a bottom portion 32a, but may be a cylinder in which one end opening is closed with a lid. In the present embodiment, the ignition chamber cup member 32 is made from stainless steel.

A communication hole 34 communicating an ignition chamber (a chamber for charging a gas generating agent) 33 with the first combustion chamber 31 is formed in the circumferential wall 32b of the ignition chamber cup member 32. The formation position of the communication hole 34 and the number thereof are adjusted to enable most uniform ignition of the first gas generating agent, and the communication hole may be closed with a seal tape (not shown in the drawing) prior to actuation.

The ignition chamber cup member 32 covers and is fixed to the first igniter assembly 21, and the space inside thereof serves as an ignition chamber 33. The first igniter 23 and a known transfer charge (black powder such as boron niter, or a gas generating agent with a high combustion temperature), that is ignited and burned by the igniter 23, are loaded in the interior of the ignition chamber 33.

The state in which the ignition chamber cup member 32 is fixed to the first igniter assembly 21 will be explained below with reference to FIG. 1 and FIG. 2.

As shown in FIG. 2, the first igniter collar 22 has a fixing portion 50 that is partially fitted into the hole of the bottom surface 13a and protrudes in a remaining portion thereof to the inner side of the bottom surface 13a, and a guide portion 54 formed axially in contact with the fixing portion 50. The fixing portion 50 and the guide portion 54 are made from carbon steel.

The outer diameter (D1) of the fixing portion 50 of the first igniter collar 22 and the outer diameter (D2) of the guide portion 54 satisfy the following relationship: D1>D2. D1 and D2 can be, for example, such that D2/D1 is within a range of 0.96 to 0.99.

Because of such a difference in outer diameter, an annular surface 51 is formed at the boundary section of the fixing portion 50 and the guide portion 54. From the standpoint of facilitating the operability when fitting the ignition chamber cup member 32, it is preferred that the outer circumferential edge portion of the annular surface 51 be rounded by chamfering.

The inner diameter (R1) of the ignition chamber cup member 32 and the outer diameter (D1) of the fixing portion 50 satisfy the relationship D1≥R1. When D1>R1, D1 can be be made larger than R1 by about 0.1 mm prior to press-fitting the ignition chamber cup member 32.

The outer diameter (D2) of the guide portion 54 and the inner diameter (R1) of the ignition chamber cup member 32 satisfy the relationship R1>D2.

In the drawing, the axial length (L1) of the fixing portion 50 and the axial length (L2) of the guide portion 54 are L2>L1, but the reverse relationship is possible, or the lengths may be equal to each other. The axial length (L1) of the fixing portion 50 can be made 3 mm to 6 mm, and the axial length (L2) of the guide portion 54 can be made about 3 mm.

In the gas generator 10 shown in FIG. 1 and (b) in FIG. 2, the ignition chamber cup member 32 is fixed in a state in which the inner circumferential wall surface of the ignition chamber cup member 32 is press-fitted to the outer circumferential wall surface of the fixing portion 50, and an annular gap 52 is formed between the inner circumferential wall surface of the ignition chamber cup member 32 and the outer circumferential wall surface of the guide portion 54. A portion of the ignition chamber cup member 32 accommodating the fixing portion 50 and the guide portion 54 has a constant inner diameter.

The bottom portion 32a is abutted against a top surface 12a of the housing 11. An opening 32c abuts against a gasket sheet 18 disposed at the bottom surface 13a of the housing 11. The gasket sheet 18 functions to maintain the interiors of the ignition chamber 33 and the second combustion chamber 35 in an air-tight state. However, the gasket sheet 18 can be omitted, provided air-tight state is obtained.

A combustion chamber cup member 41 is disposed adjacently to the ignition chamber cup member 32 inside the first combustion chamber 31.

A second combustion chamber 35 is fainted inside the combustion chamber cup member 41, and a second gas generating agent (not shown in the drawing) is loaded therein. The inner diameter of the combustion chamber cup member 41 is larger than the inner diameter of the ignition chamber cup member 32.

The combustion chamber cup member 41 is a cup having a bottom portion 41a, and an opening 41c is press-fitted to the second igniter collar 26. The fixed state of the combustion chamber cup member 41 and the second igniter collar 26 is the same as shown in FIG. 1 of JP-A No. 2007-15675, but can be also made identical to the fixed state of the above-described ignition chamber cup member 32 and the first igniter assembly 21.

The bottom portion 41a of the combustion chamber cup member 41 is abutted against the top surface 12a of the housing 11. The circumferential edge of the opening 41c is abutted against the gasket sheet 18 disposed at the bottom surface 13a of the housing 11.

A communication hole 42 communicating the second combustion chamber 35 with the first combustion chamber 31 is formed in a circumferential wall 41b of the combustion chamber cup member 41 and covered from outside (from the first combustion chamber 31 side) with a stainless steel seal tape 42a. The seal tape 42a opens the communication hole 42 only when the second gas generating agent is ignited and does not open the communication hole 42 when the first gas generating agent burns. The communication hole 42 can be also closed by covering with the cup-shaped member such as described in JP-A No. 2010-070073, instead of using the seal tape 42a.

A method for assembling the gas generator shown in FIG. 1 and FIG. 2 will be explained below.

A known method can be employed for assembling the gas generator shown in FIG. 1, but the present invention involves a new step for fitting and fixing the ignition chamber cup member 32 to the first igniter assembly 21 fixed to the housing bottom surface 13a, such as shown in (a) and (b) in FIG. 2.

As shown in (a) in FIG. 2, the ignition chamber cup member 32 covers the first igniter assembly 21 (the first igniter 23) from an ignition portion 23a.

In this case, the central axis of the ignition chamber cup member 32 and the central axis X1 of the igniter assembly 21 are aligned, and, in this state, the opening 32c of the ignition chamber cup member 32 overpasses the guide portion 54 of the first igniter collar 22 and the ignition chamber cup member 32 is eventually press-fitted and fixed to the fixing portion 50.

In the step for fitting the ignition chamber cup member 32 to the igniter assembly 21, if the ignition chamber cup member 32 tilts and the central axis X1 of the igniter assembly 21 is displaced with respect to that of the ignition chamber cup member 32 and the ignition chamber cup member 32 is pushed for fitting in this state, the ignition chamber cup member 32 is deformed or the first igniter collar 22 can be damaged. In such a case, these members become unusable.

However, in the gas generator in accordance with the present invention, since the above-described dimensional relationship is fulfilled, the displacement of the central axis X1 of the igniter assembly 21 with respect to that of the ignition chamber cup member 32 is corrected as the opening 32c of the ignition chamber cup member 32 moves past the guide portion 54. In other words, the fixing portion 50 is a portion used for press-fitting the ignition chamber cup member 32. Further, the guide portion 54 controls the inclination of the opening 32c of the ignition chamber cup member 32 against the axis X1 while the opening is introduced along the axis X1 as far as the annular surface 51.

By pushing the ignition chamber cup member 32 after the correction, it is possible to press-fit the ignition chamber cup member 32 to the fixing portion 50 as shown in (b) in FIG. 2. Further, when the ignition chamber cup member 32 is fitted as far as the guide portion 54, the ignition chamber cup member 32 aligns with the central axis X1 of the first igniter assembly 21. Therefore, deformation or damage is unlikely to occur in the step for press-fitting at the fixing portion 50.

The actuation of the gas generator 10 shown in FIG. 1 will be explained below.

In the gas generator shown in FIG. 1, generally, the respective igniters 23, 27 are connected to an actuation circuit (a control unit), and the first igniter 23 and the second igniter 27 are actuated simultaneously, or only the first igniter 23 is actuated, or the first igniter 23 is initially actuated and then the second igniter 27 is later actuated, depending on the intensity of the external impact. However, in the explanation below, the case will be considered in which the first igniter 23 is initially actuated and then the second igniter 27 is later actuated.

When an automobile collides and an impact is received, an actuation signal is received from the control unit and the first igniter 23 is actuated and ignited, thereby igniting and burning the transfer charge (combustion products are generated inside the ignition chamber 33). Then, the combustion products are released into the first combustion chamber 31 through the communication hole 34, and the first gas generating agent is ignited and burned. In this case, since the ignition chamber cup member 32 and the fixing portion 50 are press-fitted, it is unlikely that the combustion products leak from the opening 32c.

The first gas generating agent burns, thereby generating high-temperature combustion gas. After being filtered and cooled when passing through the filter 45, the gas ruptures the seal tape 15 and is released from the gas discharge port 14 to inflate the airbag.

In this case, the communication hole 42 formed in the combustion chamber cup member 41 is closed by the stainless seal tape 42a, and therefore the high-temperature combustion gas does not flow into the second combustion chamber 35. As a result, the second gas generating agent does not burn at this stage.

The second igniter 27 is actuated with a slight delay to ignite and burn the second gas generating agent. The high-temperature combustion gas is thus generated, and a pressure inside the second combustion chamber 35 rises. This increase in pressure displaces the seal tape 42a covering the communication hole 42 so that the seal tape falls down, and the communication hole 42 is open. As a result, the combustion gas generated by the second gas generating agent flows through the communication hole 42 into the first combustion chamber 31. The gas is filtered and cooled when passing through the filter 45 and then released from the gas discharge port 14 to inflate the airbag.

Figure 3:
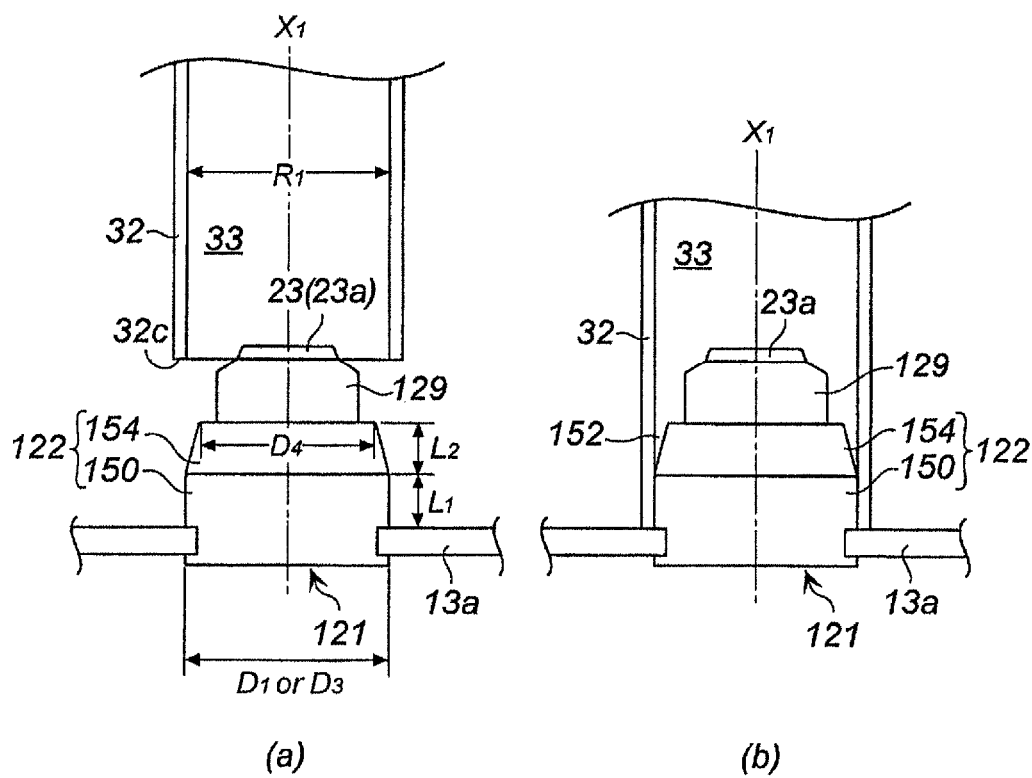
FIG. 3 is an explanatory drawing (an axial sectional view) illustrating a method for assembling the igniter assembly and the cup member when the igniter assembly of an embodiment other than that shown in FIG. 2 is used.

(2) Gas Generator Shown in FIG. 3

(a) and (b) in FIG. 3 correspond to (a) and (b) in FIG. 2, respectively. The shape of a guide portion 154 in FIG. 3 is different from that of the guide portion 54 in FIG. 2, but other parts are the same as in the gas generator shown in FIG. 1.

A first igniter assembly 121 has a first igniter 23 fixed to a first igniter collar 122, and the first igniter collar 122 and the first igniter 23 are integrated by a resin 129.

The first igniter collar 122 has a fixing portion 150 and a guide portion 154.

The guide portion 154 has an inclined surface in which the outer diameter (D3) of the portion that is in contact with the fixing portion 150 is a maximum diameter, and the outer diameter (D4) of the portion on the opposite side in the axial direction is a minimum diameter.

The ratio D4/D3 of the minimum outer diameter (D4) and the maximum outer diameter (D3) of the guide portion 154 can be set within a range of 0.96 to 0.99.

The outer diameter (D1) of the fixing portion 150 and the maximum outer diameter (D3) of the guide portion 154 satisfy the relationship D1=D3.

The inner diameter (R1) of the ignition chamber cup member 32, the outer diameter (D1) of the fixing portion 150, and the maximum outer diameter (D3) of the guide portion satisfy the relationship: D1=D3≥R1.

When D1=D3>R1, the D1 and D3 can be made greater than R1 by 0.1 mm before the ignition chamber cup member 32 is press-fitted.

The minimum outer diameter (D4) of the guide portion 154 and the inner diameter (R1) of the ignition chamber cup member 32 satisfy the relationship R1>D4. In the ignition chamber cup member 32, the portions corresponding to the fixing portion 150 and the guide portion 154 have a constant inner diameter.

Further, the axial length (L1) of the fixing portion 150 and the axial length (L2) of the guide portion 154 satisfy the relationship L2≥L1. The axial length (L1) of the fixing portion 150 can be set to 3 mm to 6 mm, and the axial length (L2) of the guide portion 154 is about 3 mm.

A method for assembling the gas generator shown in FIG. 3 is explained below.

As shown in (a) in FIG. 3, the ignition chamber cup member 32 covers the first igniter assembly 121 (first igniter 23) from the ignition portion 23a thereof.

In this case, the central axis of the ignition chamber cup member 32 and the central axis X1 of the igniter assembly 121 are aligned, and, in this state, the opening 32c of the ignition chamber cup member 32 overpasses the guide portion 154 of the first igniter collar 122 and the ignition chamber cup member 32 is eventually press-fitted and fixed to the fixing portion 150.

In the step for fitting the ignition chamber cup member 32 to the igniter assembly 121, if the ignition chamber cup member 32 tilts and the central axis X1 of the igniter assembly 121 is displaced with respect to that of the ignition chamber cup member 32 and the ignition chamber cup member 32 is pushed for fitting in this state, the ignition chamber cup member 32 is deformed or the first igniter collar 122 can be damaged. In such a case, these members become unusable.

However, in the gas generator in accordance with the present invention, since the above-described dimensional relationship is fulfilled, the displacement of the central axis X1 of the igniter assembly 121 with respect to that of the ignition chamber cup member 32 can be corrected as the opening 32c of the ignition chamber cup member 32 moves past the guide portion 154. In other words, the fixing portion 150 is a portion for press-fitting the ignition chamber cup member 32. Further, the guide portion 154 controls the inclination of the opening 32c of the ignition chamber cup member 32 against the axis X1 while the opening is introduced along the axis X1.

By pushing the ignition chamber cup member 32 after the correction, it is possible to press-fit the ignition chamber cup member 32 to the fixing portion 150 along the axis X1 as shown in (b) in FIG. 3. Further, when the ignition chamber cup member 32 is fitted as far as the guide portion 154, the ignition chamber cup member 32 aligns with the central axis X1 of the first igniter assembly 121. Therefore, deformation or damage is unlikely to occur in the step for press-fitting at the fixing portion 150.

When the cup member 32 is fixed to the igniter assembly 121, an annular gap 152 is formed between the inner circumferential wall surface of the ignition chamber cup member 32 and the outer circumferential wall surface of the guide portion 154.

Figure 4:
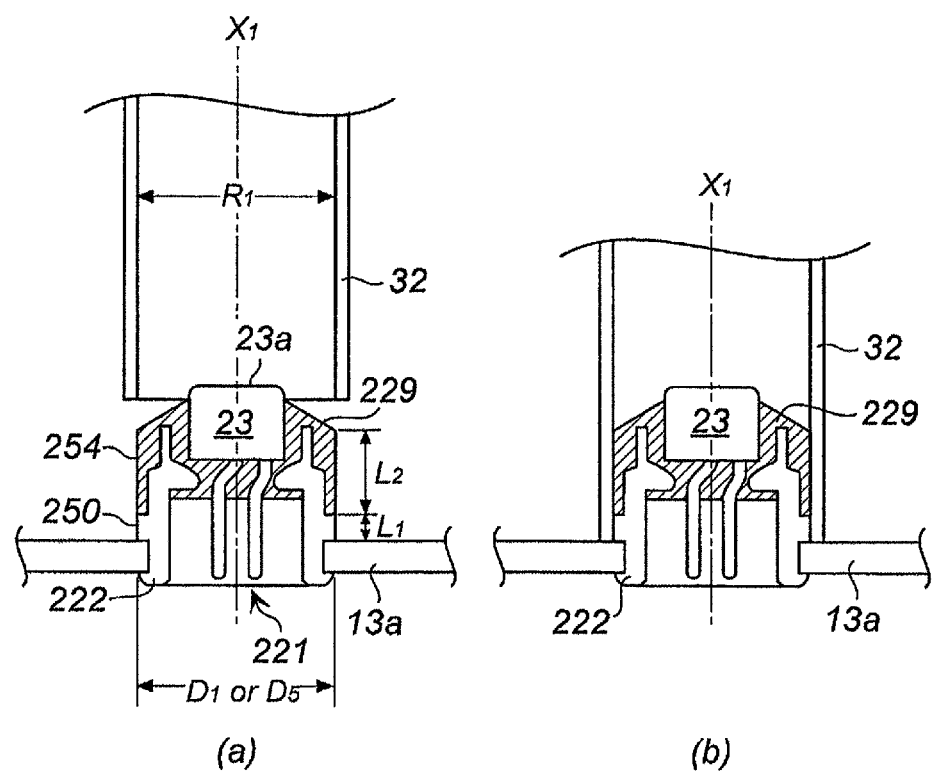
FIG. 4 is an explanatory drawing (an axial sectional view) illustrating a method for assembling the igniter assembly and the cup member when the igniter assembly of an embodiment still other than that shown in FIG. 2 is used.

(3) Gas Generator Shown in FIG. 4

(a) and (b) in FIG. 4 correspond to (a) and (b) in FIG. 2, respectively. The structure of a first igniter assembly 221 in FIG. 4 is different from that shown in FIG. 2, but other parts are the same as in the gas generator shown in FIG. 1.

The first igniter assembly 221 has a first igniter 23 fixed to a first igniter collar 222, and the first igniter collar 222 and the first igniter 23 are integrated by a resin 229.

The most part of the first igniter collar 222 is embedded in the resin 229, part on the bottom surface 13a side is exposed, and the fixing portion 250 is formed.

In the embodiment shown in FIG. 4, since the most part of the first igniter collar 222 is embedded in the resin 229, the outer circumferential wall surface of the resin 229 becomes a guide portion 254.

The outer diameter (D1) of the fixing portion 250 is equal to the outer diameter (D5) of the guide portion 254.

Further, D1=D5≧R1 is satisfied, and the D1 and D5 can be made greater than R1 by 0.1 mm before the ignition chamber cup member 32 is press-fitted.

In the drawing, the axial length (L1) of the fixing portion 250 and the axial length (L2) of the guide portion 254 satisfy the relationship L2>L1, but the reverse relationship is also possible, or the two lengths may be equal to each other. The axial length (L1) of the fixing portion 250 is set to 3 mm to 6 mm, and the axial length (L2) of the guide portion 254 is about 3 mm. A portion of the ignition chamber cup member 32 corresponding to the fixing portion 250 and the guide portion 254 has a constant inner diameter.

A method for assembling the gas generator shown in FIG. 4 is explained below.

As shown in (a) in FIG. 4, the ignition chamber cup member 32 covers the first igniter assembly 221 (first igniter 23) from the ignition portion 23a thereof.

In this case, the central axis of the ignition chamber cup member 32 and the central axis X1 of the first igniter assembly 221 are aligned, and, in this state, the opening 32c of the ignition chamber cup member 32 overpasses the guide portion 254 of the first igniter collar 222 and the ignition chamber cup member 32 is eventually press-fitted and fixed to the fixing portion 250.

In the step for fitting the ignition chamber cup member 32 to the igniter assembly 221, if the ignition chamber cup member 32 tilts and the central axis X1 of the igniter assembly 221 is displaced with respect to that of the ignition chamber cup member 32 and the ignition chamber cup member 32 is pushed for fitting in this state, the ignition chamber cup member 32 is deformed or the first igniter collar 222 can be damaged. In such a case, these members become unusable.

However, in the gas generator in accordance with the present invention, the above-described dimensional relationship is satisfied, the ignition chamber cup member 32 is made from a metal and is hard, and the guide portion 254 is made from a resin and is relatively soft. Therefore, the displacement of the central axis X1 of the igniter assembly 221 with respect to that of the ignition chamber cup member 32 is corrected as the opening 32c of the ignition chamber cup member 32 moves past the guide portion 254. In other words, the fixing portion 250 is a portion for press-fitting the ignition chamber cup member 32. Further, the outer circumferential surface of the guide portion 254 may be shaved off as the ignition chamber cup member 32 is fitted, thereby controlling the inclination of the ignition chamber cup member 32 against the axis X1 while the ignition chamber cup member is introduced along the axis X1. The guide portion 254 may abut against the inner circumferential surface of the ignition chamber cup member 32 and may have no press-fitting or fixing function such as that of the fixing portion 250.

By pushing the ignition chamber cup member 32 after the correction, it is possible to press-fit the ignition chamber cup member 32 to the fixing portion 250 along the axis X1 as shown in (b) in FIG. 4. Further, when the ignition chamber cup member 32 is fitted as far as the guide portion 254, the ignition chamber cup member 32 is easily aligned along the central axis X1 of the igniter assembly 221 at the resin 229, and deformation or damage is unlikely to occur in the press-fitting step.

Although resin of the guide portion 254 is apparently shaved off in the process of pushing the ignition chamber cup member 32, the shaved-off amount is very small and does not adversely affect the actuation of the first igniter assembly 221 or the press-fitting state of the first igniter assembly 221 and the ignition chamber cup member 32.

Figure 5:
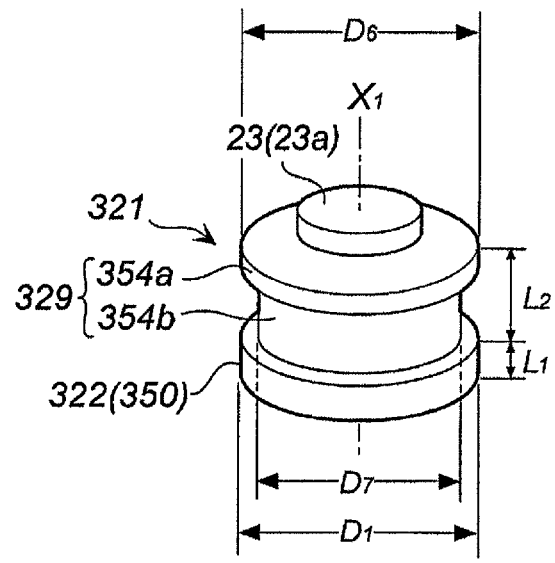
FIG. 5 is a perspective view of the igniter assembly according to yet another embodiment different from that shown in FIG. 2.

(4) Gas Generator Shown in FIG. 5

FIG. 5 (a perspective view) corresponds to (a) in FIG. 2. The structure of a first igniter assembly 321 in FIG. 5 is different from that shown in FIG. 2, but other parts are the same as in the gas generator shown in FIG. 1.

The first igniter assembly 321 has a first igniter 23 fixed to a first igniter collar 322, and the first igniter collar 322 and the first igniter 23 are integrated by a resin 329.

Part of the first igniter collar 322 is fitted in the hole of the housing bottom surface 13a in the same manner as shown in FIG. 2 to FIG. 4, and the remaining part of the first ignition collar is projected and exposed to the inner side of the housing bottom surface and serves as a fixing portion 350.

A resin section 329 enclosing the remaining part of the first igniter collar 322 has a first guide portion 354a that is in contact with the ignition portion 23a, and a second guide portion 354b located between the first guide portion 354a and the fixing portion 322. The first guide portion 354a protrudes circumferentially outside from the second guide portion 354b, but can be formed with a plurality of discontinuous protrusions, rather than a protrusion continuous in the circumferential direction.

The outer diameter (D1) of the fixing portion 350 is equal to the outer diameter (D6) of the first guide portion 354a.

The outer diameter (D1) of the fixing portion 350 and the outer diameter (D7) of the second guide portion 354b satisfy the following relationship: D1>D7.

In the same manner as shown in FIG. 2 to FIG. 4, the inner diameter (R1) of the ignition chamber cup member 32 fitted to the first igniter assembly 321, the outer diameter (D1) of the fixing portion 350 and the outer diameter (D6) of the first guide portion 354a satisfy the relationship D1=D6≧R1.

When D1>R1, D1 and D6 can be made larger than R1 by 0.1 mm prior to press-fitting the ignition chamber cup member 32.

The inner diameter (R1) of the ignition chamber cup member 32 and the outer diameter (D7) of the second guide portion 354b satisfy the relationship R1>D7.

In the drawing, the axial length (L1) of the fixing portion 350 and the total axial length (L2) of the first guide portion 354a and the second guide portion 354b satisfy the relationship L2>L1, but the reverse relationship is possible, or the lengths may be equal to each other. The axial length (L1) of the fixing portion 350 is 3 mm to 6 mm, and the total axial length (L2) of the first guide portion 354a and the second guide portion 354b is about 3 mm. A portion of the ignition chamber cup member 32 corresponding to the fixing portion 350 and the resin 329 has a constant inner diameter.

A method for assembling the gas generator in FIG. 5 is explained below.

The ignition chamber cup member 32 covers the first igniter assembly 321 (first igniter 23) from the ignition portion 23a thereof in the same manner as shown in FIG. 2 to FIG. 4.

In this case, the central axis of the ignition chamber cup member 32 and the central axis X1 of the first igniter assembly 321 are aligned, and, in this state, the opening 32c of the ignition chamber cup member 32 overpasses the first guide portion 354a and the second guide portion 354b, and the ignition chamber cup member 32 is eventually press-fitted and fixed to the fixing portion 350.

In the step for fitting the ignition chamber cup member 32 to the igniter assembly 321, if the ignition chamber cup member 32 tilts and the central axis X1 of the igniter assembly 321 is displaced with respect to that of the ignition chamber cup member 32 and the ignition chamber cup member 32 is pushed for fitting in this state, the ignition chamber cup member 32 is deformed or the first igniter collar 322 can be damaged. In such a case, these members become unusable.

However, in the gas generator in accordance with the present invention, the above-described dimensional relationship is satisfied, the ignition chamber cup member 32 is made from a metal and is hard, and the first guide portion 354a is made from a resin and is relatively soft. Therefore, the displacement of the central axis X1 of the igniter assembly 321 with respect to that of the ignition chamber cup member 32 is corrected as the opening 32c of the ignition chamber cup member 32 moves past the first guide portion 354a and the second guide portion 354b. In other words, the fixing portion 350 is a portion for press-fitting the ignition chamber cup member 32.

Further, the outer circumferential surface of the first guide portion 354a may be shaved off as the ignition chamber cup member 32 is fitted, thereby controlling the inclination of the ignition chamber cup member 32 against the axis X1 while the ignition chamber cup member is introduced along the axis X1. The first guide portion 354a may abut against the inner circumferential surface of the ignition chamber cup member 32 and may have no press-fitting or fixing function such as that of the fixing portion 350.

Further, by pushing the ignition chamber cup member 32 after the correction, it is possible to press-fit the ignition chamber cup member 32 to the fixing portion 350 along the axis X1 similarly to FIG. 2 to FIG. 4. When the ignition chamber cup member 32 is fitted as far as the second guide portion 354b, the ignition chamber cup member 32 is easily aligned along the central axis X1 of the first igniter assembly 321 at the resin 329, and deformation or damage is unlikely to occur in the press-fitting step at the fixing portion 350. An annular gap is formed between the inner circumferential wall surface of the ignition chamber cup member 32 and the outer circumferential wall surface of the second guide portion 354b.

Although the resin of the first guide portion 354a is apparently shaved off in the process of pushing the ignition chamber cup member 32, the shaved-off amount is very small and does not adversely affect the actuation of the first igniter assembly 321 or the press-fitting state of the first igniter assembly 321 and the ignition chamber cup member 32.

Figure 6:
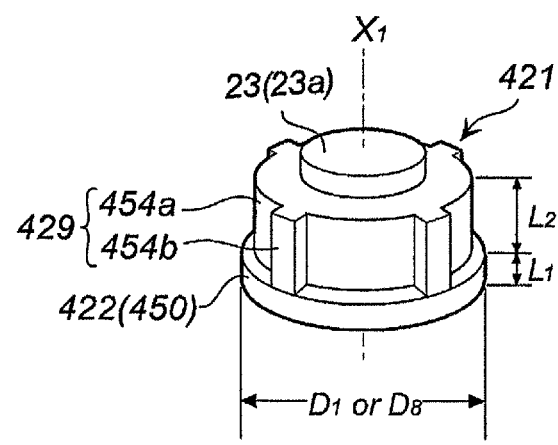
FIG. 6 is a perspective view of the igniter assembly according to yet another embodiment different from that shown in FIG. 2.

(5) Gas Generator Shown in FIG. 6

FIG. 6 (a perspective view) corresponds to (a) in FIG. 2. A first igniter assembly 421 in FIG. 6 is different from the igniter assembly shown in FIG. 2, but other parts are the same as in the gas generator shown in FIG. 1.

The first igniter assembly 421 has a first igniter 23 fixed to a first igniter collar 422, and the first igniter collar 422 and the first igniter 23 are integrated by a resin 429.

Part of the first igniter collar 422 is fitted in the hole of the housing bottom surface 13a in the same manner as shown in FIG. 2 to FIG. 4, and a part of the remaining part of the first ignition collar is projected and exposed to the inner side of the housing bottom surface and serves as a fixing portion 450.

A resin 429 enclosing the remaining part of the first igniter collar 422 has a columnar portion 454a and a plurality of protruding portions 454b protruding radially from the outer circumferential surface of the round columnar portion 454a.

The protruding portions 454b are preferably formed equidistantly in the circumferential direction, and the total number thereof may be an even number or an odd number.

The outer diameter (D1) of the fixing portion 450 and the outer diameter (D8) of the circle passing the tips of the protruding portions 454b satisfy the relationship D1=D8.

In the same manner as shown in FIG. 2 to FIG. 4, the inner diameter (R1) of the ignition chamber cup member 32 fitted into the first igniter assembly 421, the outer diameter (D1) of the fixing portion 450 and the outer diameter (D8) of the circle passing through the tips of the protruding portions 454b satisfy the relationship D1=D8≥R1.

When D1=D8>R1, D1 and D8 can be made larger than R1 by about 0.1 mm prior to press-fitting the ignition chamber cup member 32.

In the drawing, the axial length (L1) of the fixing portion 450 and the axial length (L2) of the columnar portion 454a (the protruding portions 454b) satisfy the relationship L2>L1, but the reverse relationship is possible, or the lengths may be equal to each other. The axial length (L1) of the fixing portion 450 is 3 mm to 6 mm, and the axial length (L2) of the columnar portion 454a (the protruding portions 454b) is about 3 mm. A portion of the ignition chamber cup member 32 corresponding to the fixing portion 450 and the resin 429 has a constant inner diameter.

A method for assembling the gas generator shown in FIG. 6 is explained below.

The ignition chamber cup member 32 covers the first igniter assembly 421 (first igniter 23) from the ignition portion 23a thereof in the same manner as shown in FIG. 2 to FIG. 4.

In this case, the central axis of the ignition chamber cup member 32 and the central axis X1 of the first igniter assembly 421 are aligned, and, in this state, the opening 32c of the ignition chamber cup member 32 overpasses the columnar portion 454a and the protruding portion 454b, and the ignition chamber cup member 32 is eventually press-fitted and fixed to the fixing portion 450.

In the step for fitting the ignition chamber cup member 32 to the igniter assembly 421, if the ignition chamber cup member 32 tilts and the central axis X1 of the igniter assembly 421 is displaced with respect to that of the ignition chamber cup member 32 and the ignition chamber cup member 32 is pushed for fitting in this state, the ignition chamber cup member 32 is deformed or the first igniter collar 422 can be damaged. In such a case, these members become unusable.

However, in the gas generator in accordance with the present invention, the above-described dimensional relationship is satisfied, the ignition chamber cup member 32 is made from a metal and is hard, and the protruding portions 454b are made from a resin and are relatively soft. Therefore, the displacement of the central axis X1 of the igniter assembly 421 with respect to that of the ignition chamber cup member 32 can be corrected as the opening 32c of the ignition chamber cup member 32 moves past the columnar portion 454a and the protruding portions 454b. In other words, the fixing portion 450 is a portion for press-fitting the ignition chamber cup member 32.

Further, the outer circumferential surface of the protruding portions 454b may be shaved off as the ignition chamber cup member 32 is fitted, thereby controlling the inclination of the ignition chamber cup member 32 against the axis X1 while the ignition chamber cup member is introduced along the axis X1. The protruding portions 454b just abuts against the inner circumferential surface of the ignition chamber cup member 32 and may have no press-fitting or fixing function such as that of the fixing portion 450.

Further, by pushing the ignition chamber cup member 32 after the correction, it is possible to press-fit the ignition chamber cup member 32 to the fixing portion 450 along the axis X1 as shown in (b) in FIG. 2 to (b) in FIG. 4. When the ignition chamber cup member 32 is fitted as far as the protruding portions 454b, the ignition chamber cup member 32 is easily aligned along the central axis X1 of the first igniter assembly 421 at the resin 429, and deformation or damage is unlikely to occur in the press-fitting step at the fixing portion 450. A gap is formed between the inner circumferential wall surface of the ignition chamber cup member 32 and the outer circumferential wall surface of the columnar portion 454a.

Although the resin of the protruding portions 454b is apparently shaved off in the process of pushing the ignition chamber cup member 32, the shaved-off amount is very small and does not adversely affect the actuation of the first igniter assembly 421 or the press-fitting state of the first igniter assembly 421 and the ignition chamber cup member 32.

In the above-described embodiment, a taper (a shape such that the inner diameter increases toward the opening 32c side) is formed on the inner circumferential wall surface of the opening 32c of the ignition chamber cup member 32 to facilitate the fitting of the ignition chamber cup member 32 to the first igniter assembly. Further, the drawings schematically illustrate the invention and do nor represent the actual dimensional relationships.

In FIG. 1, a dual-type gas generator is explained, but such an example is not limiting, and, for example, the present invention can be applied to fixing the tubular member 30 and the collar 41 in a single-type gas generator such as shown in FIG. 1 or FIG. 5 in JP-A No. 2005-178599. Further, those configurations may be also used in the second igniter collar 26 and the combustion chamber cup member 41 shown in FIG. 1. Furthermore, the shape and formation positions of the guide portion, a protrusion, and a fixing portion, and the shape of the ignition chamber cup member 32 are not limited to the present embodiments.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
   a housing provided with a gas discharge port and accommodating, therein, a gas generating agent;
   an igniter assembly accommodated in the housing, the igniter assembly including an igniter main body, which includes an ignition portion and an electro-conductive pin, a metallic collar, and a resin integrating the igniter main body and the metallic collar; and
   a metallic cylindrical member disposed inside the housing, the metallic cylindrical member covering the igniter assembly and defining, therein, an ignition chamber;
   the metallic collar having,
      a fixing portion including an insertion portion inserted into a hole in a bottom surface of the housing, and
   the resin having,
      a guide portion being axially in connection with the fixing portion, a portion of the metallic cylindrical member corresponding to the fixing portion and the resin having a constant diameter;
   the guide portion including a second guide portion formed axially in contact with the fixing portion, and a first guide portion formed axially in contact with the second guide portion;
   the metallic cylindrical member, the resin, and the metallic collar satisfying
   $D1=D6$, where $D1$ is an outer diameter of the fixing portion and $D6$ is an outer diameter of the first guide portion,
   $D1>D7$, where $D7$ is an outer diameter of the second guide portion,
   $D1=D6 \geq R1$, where $R1$ is an inner diameter of the metallic cylindrical member; and
   the metallic cylindrical member being fixed in a state in which an inner circumferential wall surface of the metallic cylindrical member and an outer circumferential wall surface of the fixing portion are press-fitted, and an annular gap is formed between the inner circumferential wall surface of the metallic cylindrical member and an outer circumferential wall surface of the second guide portion, and the inner circumferential wall surface of the metallic cylindrical member and an outer circumferential wall surface of the first guide portion are abutted against each other.

2. The gas generator according to claim 1, wherein the metallic cylindrical member is made from stainless steel, and the metallic collar is made from aluminum.

3. A method for assembling the gas generator according to claim 1, comprising the step of:
   fitting and fixing the metallic cylindrical member to the igniter assembly that is fixed to the bottom surface of the housing, wherein,
   the fitting and fixing step further includes,
   aligning a central axis of the metallic cylindrical member and a central axis of the igniter assembly when the metallic cylindrical member is fitted to the igniter assembly from a side of the ignition portion thereof,
   inserting and fixing an opening of the metallic cylindrical member to the fixing portion through the guide portion, and
   correcting a displacement of the central axis of the metallic cylindrical member and a central axis of the igniter assembly while inserting the opening of the metallic cylindrical member through the guide portion, when the central axis of the metallic cylindrical member and the central axis of the igniter assembly are displaced with respect to each other.

* * * * *